March 19, 1968     J. S. BAER     3,373,851

CLUTCH AND FRAME UNIT

Filed Feb. 11, 1966     2 Sheets-Sheet 1

INVENTOR:
JOHN S. BAER
BY Howson & Howson
ATTYS.

March 19, 1968  J. S. BAER  3,373,851
CLUTCH AND FRAME UNIT
Filed Feb. 11, 1966  2 Sheets-Sheet 2
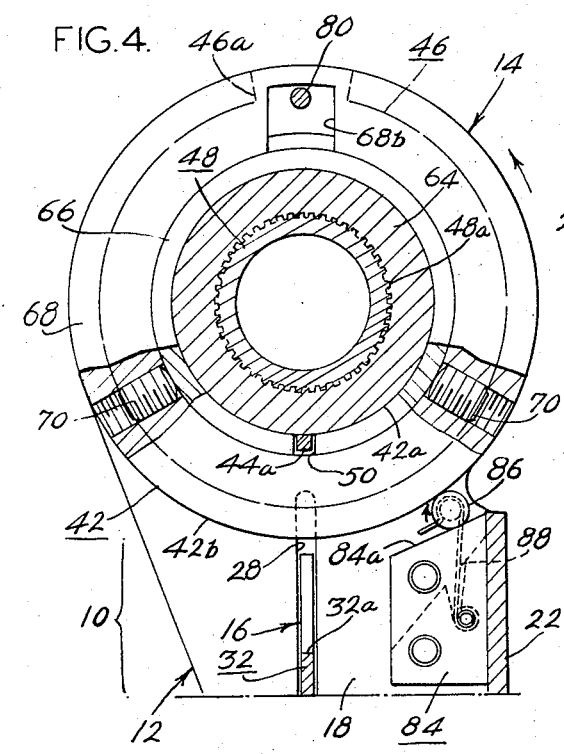
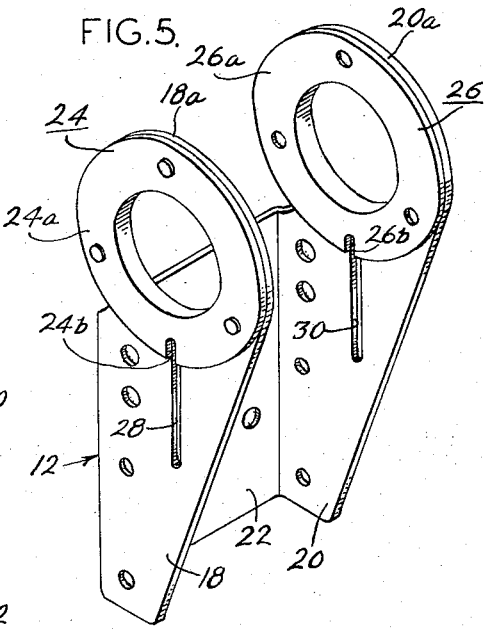
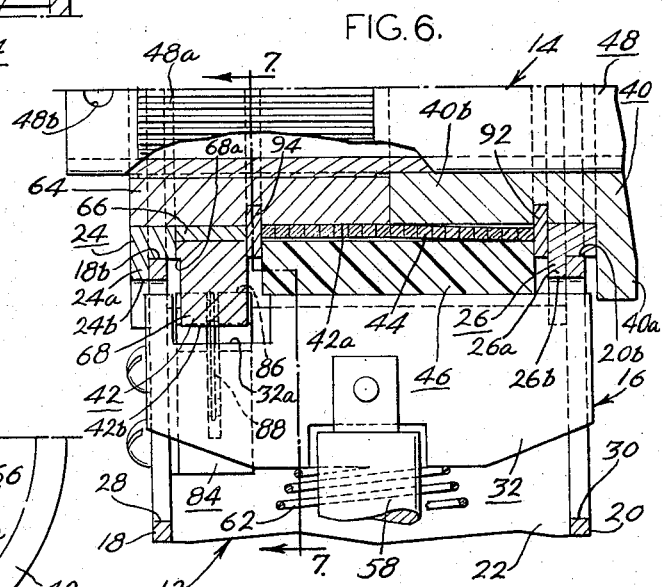
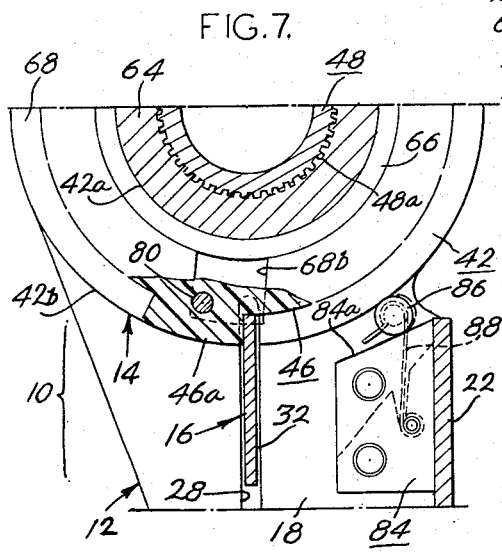
INVENTOR:
JOHN S. BAER
BY Howson & Howson
ATTYS.

United States Patent Office 3,373,851
Patented Mar. 19, 1968

3,373,851
CLUTCH AND FRAME UNIT
John S. Baer, Medford Lakes, N.J., assignor to Precision Specialties, Inc., Pitman, N.J., a corporation of Missouri
Filed Feb. 11, 1966, Ser. No. 526,911
17 Claims. (Cl. 192—12)

ABSTRACT OF THE DISCLOSURE

A clutch unit is provided having rotatable members including a driving hub, a driven hub and a tubular shaft providing support of the driving hub and the driven hub, at least one of the hubs being rotatable relative to the shaft. A frame is supported by at least one of the rotatable members and includes a bearing between the at least one rotatable member and the frame. Clutch means is supported by at least one of the hubs for coupling the driving hub to the driven hub, and actuator means is supported by the frame in a position to cooperate with the clutch means to actuate the clutch means between engagement and disengagement. The tubular shaft is adapted to receive and be connected to a power shaft for transmitting or receiving power. Brake means is disclosed for association with the clutch means for stopping the driven hub after the clutch means is disengaged. Means is disclosed coupled to the frame for preventing backup of the driven hub in a situation where the clutch means might otherwise reengage. Also, means is disclosed for adjustment of the stop position of the driven hub relative to the clutch means.

The present invention relates to a clutch unit and more specifically, to a spring clutch assembly having improvements in means for adjusting the stopped position of the driven output relative to its support frame which supports the stop means for disengaging the clutch.

The present invention is primarily concerned with that class of clutches which provides a clutch assembly of aligned driving and driven members with a helical spring tightly encircling a clutch surface of the driving member, and preferably a clutch surface of the driven member, and having one end of the spring attached to the driven member. The other end of the spring is attached to a control member which preferably is a collar surrounding the spring. The control member is provided with a stop portion. The wrapped spring is wound to loosen when the stop portion of the control member is engaged by stop means supported by a frame so that the spring will disengage the clutch surface of the driving member and the driving member will rotate free of the driven member. When the stop means is moved to a position away from engagement with the stop portion of the control member, the spring will return to its original condition wrapped down on the driving member so that the driving member again rotates the driven member. The stop means may be actuated to disengage the clutch once each revolution of the control member if desired.

In the prior art, various types of electrically operated single revolution clutches have been provided, but difficulties have been experienced in adjusting the driven member to a desired stopped position relative to the support structure of the stop means and the system to be driven by the clutch assembly. The clutch assembly, comprising the driving and driven members, spring and control member, has been generally supported relative to the driven system by an outside support frame not associated with the clutch. The stop means has generally been provided by a solenoid or similar device fixed to the support frame, the solenoid actuating a stop element to engage the stop portion of the control member to unwind the spring to allow the driving member to rotate free of the driven member. In such arrangements, the driven member, which is coupled to the driven system, must be rotatably adjusted relative to the support frame to have the driven system stopped at a desired position through stopping of the control member by the stop element. The alignment and positioning problems associated with connecting the relative parts, support frame, stop means, clutch assembly and power shaft of the driven system, has been costly and time consuming.

In accordance with the preferred form of the present invention, the clutch assembly, comprising the driving member, driven member, clutch spring and control member, is supported by an associated frame to provide a clutch unit which is to be mounted relative to the driven system to be coupled to the driven member. The frame has an opening therein providing an axis through the frame, and is adapted to support the relative rotatable members of the clutch assembly along the axis. The stop element is movably supported on the frame to be engagable with the stop portion of the control member to stop the rotation of the control member to unwind the spring once each revolution of the clutch. The solenoid or means for actuating the stop element is supported by the frame and is adapted to actuate the stop element between a position to engage the stop portion of the control member and a position away from engagement with the stop portion.

In this arrangement, the frame supporting the rotatable members may be rotated relative to the rotatable members about their axis of revolution to adjust the position the control member, and hence the driven member, will be stopped relative to the driven system. After the frame has been rotated to a position to have the control member stop at a position to have the driven member stopped at the desired position, the frame can be fixed relative to the driven system accordingly. In this manner, possible adjustment of shafts and gears in the driven system or other costly alignment arrangements relative to a fixed position of a support for the clutch assembly are eliminated. With the clutch unit of the present invention, the position the driven member is stopped relative to a stopped position of the control member is known, so that it is only necessary to position the frame of the present invention to have the driven member stopped at a desired position of the driven system accordingly. For example, the driven member of the clutch unit can be coupled to the driven system at the desired position for stopping, and the support frame with the stop means can be rotated to a position to have the control member stopped by the stop element with the driven member in that position. Further, the present invention provides a novel clutch unit by having the clutch assembly and the stop means coupled together and rotatable relative to one another by an integral frame.

In accordance with a further feature of the present clutch unit, if the position the frame is to be supported is fixed by the user and the desired stop position of the power shaft of the driven system is fixed, means is provided to permit adjustment of the driven member relative to the spring and control member so that the position in which the driven member will be stopped may be easily adjusted as desired.

The clutch unit of the present invention in its preferred form has brake means for coupling the control member to the driven member but permitting limited relative movement therebetween for unwinding the spring and providing a predetermined position of stopping of the driven member relative to the position the control member is stopped. In addition, means is provided supported by the frame for preventing backup of the driven member relative to the control member after the control member is stopped and the spring is unwound the limited amount.

For a better understanding of these and other features and advantages of the present invention, reference is made to the following description and accompanying drawings, in which:

FIG. 4 is a sectional view taken along line 4—4 of FIG. 3;

FIG. 5 is a perspective view of the frame for supporting the clutch assembly and electrically actuated stop;

FIG. 6 is a fragmentary sectional view similar to FIG. 3 showing the stop element supported on the frame in its position for disengaging the helical clutch spring; and FIG. 7 is a sectional view taken along line 7—7 of FIG. 6.

Figure 1:
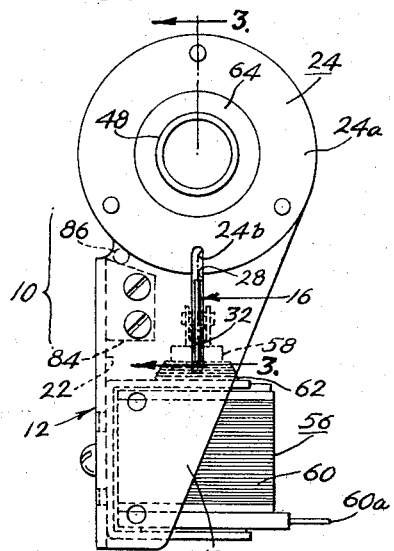
FIG. 1 is a side elevational view of the clutch unit of the present invention.
Figure 2:
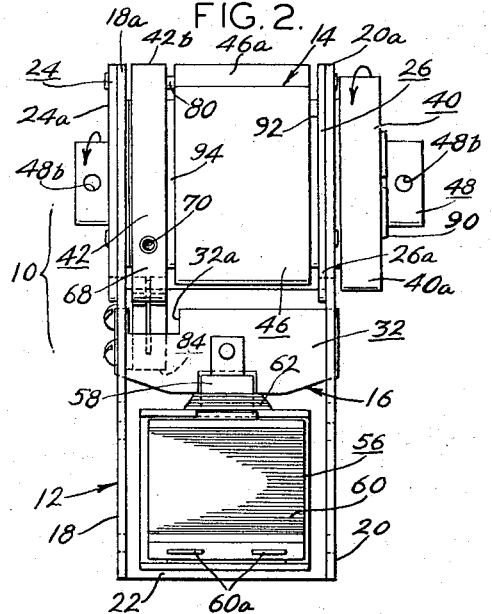
FIG. 2 is a front elevational view of the clutch unit of FIG. 1.

Referring to FIGS. 1 and 2, the clutch unit generally designated 10 may be divided into three portions, a support frame generally designated 12, a clutch assembly generally designated 14 and an electrically operated stop mechanism 16 for disengaging the clutch each revolution of the clutch assembly or multiple thereof.

The supporting frame 12 for the clutch assembly 14 and stop mechanism 16 is shown in FIGS. 1, 2 and 5. In the present instance, the frame comprises a pair of parallel side members 18 and 20 and an interconnecting member 22 joining corresponding edges of the side members to provide a channel shape with the side members, as shown in FIG. 5. The frame may be a one-piece construction of stamped metal material as shown in FIG. 5 or a three-piece construction held together by any suitable means. The side members 18 and 20 have lobes 18a and 20a, respectively, extending beyond the interconnecting member between the sides, the lobes having aligned openings 18b and 20b, respectively, which provide an axis of rotation of the clutch assembly relative to the frame. More specifically, bearing sleeves 24 and 26 are supported in openings 18b and 20b, respectively, and extend a distance beyond each side of the side members as shown most clearly in FIG. 3. The bearing sleeves 24 and 26 are each provided with a radially extending flange 24a and 26a, respectively, at one end, the flanges being fixed to the respective lobes of the side members, as by rivets, to attach the bearings to the frame. The side members 18 and 20 of the frame have aligned slots 28 and 30, respectively, which extend toward the openings in the lobes 18a and 20a, and the flanges of the bearing sleeves being provided with associated slots 24b and 26b, respectively, the slots provide a guide for a stop element or blade 32 which is part of the stop mechanism 16 to be explained hereinafter.

By the arrangement of the frame, the stop mechanism is supported on the frame and the clutch assembly is rotatably supported in the bearing sleeves along an axis through the frame. In this relationship, the frame may be rotated relative to the axis of rotation of the clutch to have the stop mechanism disengage the clutch at any desired position relative to the clutch assembly.

The clutch assembly comprises a driving hub 40 and a driven hub 42 which are rotatably supported along the axis through the frame by the bearing sleeves 26 and 24, respectively. A helical clutch spring 44 and control collar 46 complete the main elements of the clutch assembly. In various embodiments of the clutch assembly, these elements may take various forms different from the ones shown in FIGS. 3 and 4. In the present illustrated embodiment of the invention, the driving hub has a portion 40a which rotates adjacent one end of bearing sleeve 26 and a decreased diameter portion 40b extending through the bearing sleeve to provide a cylindrical clutch surface.

Figure 3:
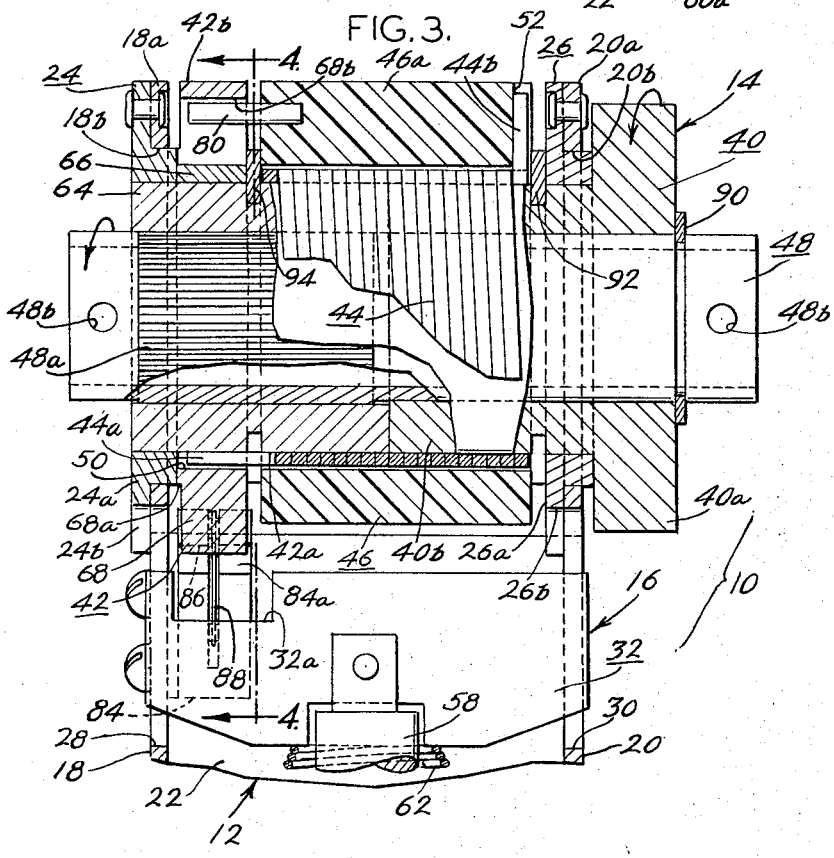
FIG. 3 is a sectional view taken along line 3—3 of FIG. 1.

The driving hub may be driven by any suitable means. The driving member rotates on a tubular output shaft 48 which extends an axial distance beyond each end of the clutch assembly for being coupled to a driven system. The tubular output shaft 48 has an axially splined portion 48a around its outer surface which is adapted to receive the annular driven member 42, which is forced onto the splined portion of the shaft so that the driven member and output shaft rotate together. The driven member has a reduced diameter portion 42a which provides a clutch surface of substantially the same diameter as the clutch surface of the driving hub. The clutch surfaces of the driving and driven hubs serve as clutch faces cooperating with closely wound helical spring 44 of square cross section, as shown in FIG. 3. The clutch spring 44 is bent at one end to provide an axial tang 44a which is inserted in a suitable hole 50 in the driven member. The opposite end of the helical spring is bent radially outwardly to provide tang 44b which extends into a suitable slot 52 in control collar 46. Under normal circumstances the clutch spring fits snugly around both clutch surfaces of the driving and driven hubs and the spring is wound in such a direction that as the driving hub is rotated, the spring tends to wind tighter in the same direction thereby affording a positive drive between the driving and driven hubs. The driving hub and driven hub in the present instance as shown in FIGS. 3 and 4 are arranged to be rotated as indicated by the directional arrows.

In order to disengage the clutch spring from the driving hub so that the driving hub may rotate relative to the clutch spring, the control collar is stopped by a stop mechanism 16 so as to loosen the spring and permit the driving hub to rotate relative to the clutch spring. The control collar 46, which may be made of a resinous material, is generally annular in form and is preferably molded with an axially extending rib 46a providing a stop engageable by the stop blade 32 movably supported on the frame. The stop blade 32 is supported by the frame in the slots 28 and 30 in the side members and slots 24a and 26a of the bearing sleeves and is movable by any suitable means from a position out of engagement with the stop 46a of the collar, as shown in FIGS. 3 and 4, to a position against the collar so that the stop 46a engages the stop blade, as shown in FIGS. 6 and 7. The stop blade 32 is provided with a cut out 32a of a size such that the radially extending increased diameter portion 42b of the driven member may fit within the cut out without engaging the blade when the blade is against the control collar, as shown in FIGS. 6 and 7. In the present instance the stop blade 32 is actuated from a position against the collar to engage stop 46a to a position out of engagement with stop 46a by solenoid 56 fixed to interconnecting member 22 of the frame as by screws. The stop blade is attached to an elongated armature 58 of a magnetic material which extends into the solenoid to be within the magnetic field of solenoid winding 60 having terminals 60a connectable to a suitable source of A.C. or D.C. voltage. There is positioned between stop blade 32 and the support for the solenoid winding, a spring 62 surrounding the armature to bias the stop blade to a position to contact with the collar and engage stop 46a when the solenoid is not energized. A power shaft of the system to be driven by the clutch may be inserted within the tubular output shaft 48, which preferably has connecting means to facilitate coupling thereof to the power shaft, such as, the output shaft being pinned to the shaft to be driven by inserting suitable pins or screws through one of the openings 48b provided in the output shaft.

In operation of the clutch unit, when the stop blade is moved to a position out of engagement with the stop 46a, as shown in FIG. 3, the helical clutch spring will be wrapped down on the clutch surfaces of the driving and driven hubs so that the driving hub will rotate the clutch spring, control collar and driven hub, which in turn will rotate the output shaft 48. When the solenoid is deenergized the spring 62 will move the stop blade in contact with the collar so that the stop blade will engage stop 46a of the collar to stop the control collar and cause helical spring 44 to unwrap from the clutch surface of the driving hub. The spring will unwind from the clutch surface of the driving hub by movement of the driven hub relative to the control collar after the control collar is stopped. The stopping of the control collar in turn stops the driven hub and output shaft through the coupling of the spring to the control collar and driven hub. It is preferable to provide some means in the driven system for absorbing the inertia of the driven system when the control collar is stopped to prevent damage to the spring and assembly.

In the arrangement of the clutch unit thus far described, the tubular output shaft may be fitted over the power shaft of the driven system (not shown) at a desired position and pinned to the shaft of the driven system. With the present clutch unit, the tubular shaft supports the clutch assembly on the power shaft of the driven system and the clutch assembly supports the frame, which in turn supports the stop means for disengaging the clutch, so that the entire unit of the clutch assembly and stop means is rotatably mounted about the same axis of rotation as the driven shaft. In this arrangement, it is only necessary to attach the frame to a structure at a desired position.

If the position of the frame is fixed by the user relative to the driven system so that adjustment of the stop position of the driven hub is not made by rotating the frame, means is provided to permit adjustment of the position of the output shaft relative to the driven member holding tang 44a of spring 44 so that the output shaft 48 may be rotated relative to the driven hub to a desired position of coupling to the driven system to have the driven hub stop the output shaft at that position when the collar is stopped. The adjustment in the present instance is provided by having the driven hub made of three pieces which are rotatably adjustable relative to one another about the common axis of rotation. The three-piece construction comprises an annular member 64 which is forced on the splined portion of the output shaft and provided the clutch surface of the driven hub, a first adjustable collar 66 surrounding a portion of the annular member 64 and a second adjustable collar 68 coaxial with first adjustable collar 66. The first adjustable collar is generally annular in form but has an axial opening between ends to provide the slot 50 which is adapted to receive tang 44a of clutch spring 44. The second adjustable collar is annular in form and surrounds the first adjustable collar. The second adjustable collar is coupled to the first adjustable collar by set screws 70 threaded in radial holes through second adjustable collar 68 to engage collar 66 to pinch collar 66 against annular member 64 so that the annular member, and first and second adjustable collars rotate as a unit providing the driven hub 42. The second collar has a reduced diameter axial extension 68a which together with the first collar member abut against the axial extension of bearing sleeve 24 to limit the movement of the driven member in one axial direction. The output shaft may be rotated relative to the adjustable collars by loosening the set screws 70 from the first adjustable collar so that output shaft 48 and annular member 42 may be rotated relative to the adjustable collars and helical spring; and after the output shaft is in the desired position relative to a shaft of the driven system, the set screws may again be tightened to engage the first collar member which in turn is caused to frictionally engage the annular member. In various embodiments of the clutch assembly, the driven member may take various forms. Particularly, for the adjustment just described, the adjustable collars 66 and 68 could be provided by a single collar which would have an axial slot to receive the tang of the spring and radial threaded holes for receiving the set screws, which would engage the annular member to cause the annular member and single adjustable collar to act as one. When the set screws in that arrangement are loosened, the annular member and output shaft could be rotated relative to the single adjustable collar and the screws again tightened at the desired position of the output shaft.

In the embodiment of the invention shown in detail in FIGS. 3 and 4, there is provided brake means associated with the control collar for stopping the driven hub at a predetermined position relative to the control collar after the control collar has been stopped but permitting limited movement between the driven hub and control collar for loosening the helical clutch spring from the driving hub. The brake means for limiting the movement of the driven hub relative to the control collar is provided by an over-travel pin 80 which is embedded in the control collar 46 and thereby moves with the collar at all times. Since the control collar 46 and driven hub 42 normally move in unison, the over-travel pin can pass through a hole in the driven hub of a size relative to the pin to provide sufficient clearance to permit limited movement of the driven hub relative to the pin and therefore the control collar, enabling unwinding of the spring, as shown in FIG. 6.

As shown in FIGS. 3 and 4, the second adjusting collar 68 is provided with a hole 68b into which the over-travel pin extends. In operation of the brake means, when the solenoid is energized, the stop blade 32 is out of engagement with the stop 46a of the control collar so that the helical clutch is wound on the driving hub. When the solenoid is deenergized, the stop element 32 will be moved against the control collar to engage stop 46a thereof, thereby stopping the control collar from further rotation relative to the frame. This action will stop the over-travel pin 80 relative to the movement of the driving and driven hubs. The effect of stopping the control collar causes helical spring 44 to unwind and disengage the spring from the driving hub so that the driving hub rotates relative to the remainder of the clutch assembly. The driven hub is prevented from moving any further than the clearance provided between the side of the hole in the second collar member 68 and the pin, since the pin is adapted to engage the side of hole 68a as shown in FIG. 7. Hence, while the driving hub continues to rotate, the second adjustable collar is stopped and hence all of the driven hub and output correspondingly, since the first and second adjustable collars 66 and 68, annular member 64 and the output shaft 48 are coupled together to rotate as a unit. The shear exerted on the pin by the driven hub when the control member is stopped is such as to have the over-travel pin receive the inertia of the output of the driven system. Depending on the relative size of the hubs, the speed at which the driving hub is rotated and the load of the output, other means may have to be provided for absorbing some of the inertia of the driven system.

A further adjustment feature is provided in the clutch assembly for adjusting the position of the over-travel pin 80 in hole 68b so as to limit the movement of the second adjustable collar, and hence the driven hub, relative to the control collar after the control collar has been stopped. The adjustment is provided by loosening the set screws 70 and moving second collar 68 relative to the first collar 66 to position over-travel pin 80 at a desired position in hole 68b in collar 68, as shown in FIG. 4. Thereafter, the set screws 70 are threaded in the second adjustable collar into engagement with the first adjustable collar to have the adjustable collars and annular member act as a unit. Thus the desired relative movement between the control collar and driven hub to loosen the clutch spring can be easily adjusted.

The movement of the first collar member relative to the second collar member enables the hole 68b to be located where necessary to receive over-travel pin 80. The enlarged hole 68b in which pin 80 is positioned is provided so that relative movement between the control collar and driven hub is allowed for loosening of the clutch spring from the driving hub but preventing any over-actuation which might damage the clutch. This adjustment is needed since tolerances in the diameter of the helical clutch spring may cause the angular position of the tangs of the spring, attached respectively to the control collar and driven hub, to differ from one clutch to another, and the movement of the adjustable collars 66 and 68, which receive the spring tang and over-travel pin, respectively, accommodate these differences.

It should be understood, as previously stated, that the set screws 70 may be loosened so that the annular member and output shaft may be rotated relative to the adjustable collar member 66 and 68 so that the output shaft may be adjusted to a desired rotational position to be stopped relative to the frame and driven system.

When the control collar is stopped and the driven hub has rotated relative to the control collar to be stopped by over-travel pin 80, means is provided for preventing back-up of the driven hub relative to the control collar. In the present embodiment the anti-backup device preventing back lash of the spring is provided by a wedge 84 attached to side member 18 of the frame by suitable means such as screws, as shown most clearly in FIGS. 1 and 4. The wedge is arranged to be fit closely adjacent the periphery of second adjustable collar 68 with the adjacent surface of the wedge closest to the periphery of the collar 68 providing a roller ramp 84a having a roller 86 thereon rotatably and movably supported by a piece of spring wire 88 held at one end by the wedge and bent around a groove in the rollar. The roller and ramp arrangement act upon adjustable collar 68 to prevent any back lash tendency which might tend to cause the driven hub to backup to retighten the spring and cause chattering thereof. The operation of the roller and wedge is such that when the driving hub is driving the driven hub through the helical clutch spring, roller 86 will be rotated by the counterclockwise rotation of the driven hub, as shown by the directional arrow in FIG. 4, rotating the roller in a clockwise direction up the roller ramp 84. On the other hand, when the adjustable collar is stopped and the driven hub rotates relative thereto to be stopped by over-travel pin 80, the backup tendency of the driven hub caused by the unwound spring would tend to rotate the driven hub in a clockwise direction as shown in FIG. 7. This rotation of the driven member has the effect of wedging the roller between the ramp and second adjustable collar 68 of the driven hub so that backup of the driven hub is prevented.

In assembly, the annular member 64 is forced on the splined portion of tubular output shaft 48 and the driving hub is fitted over the output shaft abutting the annular member and a snap ring 90 is positioned on the shaft adjacent the driving hub at the opposite end from the annular member. So as to reduce friction between the driving hub and annular driven member, the driving hub may, for example, be made of sintered bronze and the annular driven hub made of powdered iron. The spring is next inserted through control collar 46 with tang 44b of the spring being received in slot 52, then the adjustable collars are positioned relative to the control collar so that tang 44a fits within the opening in adjustable collar 66 and over-travel pin 80 fits within hole 68b of collar 68. The adjustable collars and control collar with the spring in this arrangement are then positioned between the side members 18 and 20 of the frame and axially aligned with openings in the side members. The annular member, driving member and output shaft assembly is inserted through bearing sleeve 26 through the spring and adjustable collars until the driving hub axially abuts bearing sleeve 26. In this position a snap ring 92 is positioned in a groove around the driving hub at a position between the control collar 46 and bearing sleeve 26 to hold the assembly in position. A snap ring 94 is positioned in a groove around the annular member 64 between the control collar and adjustable collars to axially space the respective collars to be closely adjacent snap ring 92 and bearing sleeve 24, respectively. The stop mechanism 16 can then be fixed to the frame with the armature 58 being received in the solenoid 56, the spring 62 surrounding the armature and the stop blade 32, which is attached to the armature, positioned in the guide slots in the side members. The solenoid 56 is then attached to interconnecting member 22 of the frame, as shown in FIGS. 1 and 2. Then the anti-backup wedge and roller arrangement can be fixed to the frame with the roller engaging the second adjustable collar 68.

After the clutch assembly has been assembled relative to the frame, the adjustment of control collar 46 relative to the adjustable collars 66 and 68 for position of the spring tangs and over-travel pin can be performed. The second adjustable collar may be adjusted relative to the first adjustable collar for positioning the over-travel pin 80 in the slot in collar 68 for the desired over-travel of the driven hub and output shaft relative to the stop position of the control collar. The output shaft can be adjusted to any desired position relative to the frame and driven hub. After the adjustments are made, the set screws 70 can be tightened to have them engage the first adjustable collar making the adjustable collars and annular member act as a unit with the output shaft, at which time the clutch unit is ready for operation.

While the invention has been described with particular reference to a specific embodiment in the interest of complete definiteness, it will be obvious to those skilled in the art that it may be embodied in a large variety of forms diverse from the one specifically shown and described. For example, the tubular output shaft may be made an input or driving shaft for the clutch assembly. In this instance, the driven hub 42 would become the driving hub and the driving hub 40 would become the driven hub, which would have its increased diameter portion within the frame to be engageable by the over-travel pin. Accordingly, the control collar and spring would be axially reversed in position and the tangs of the spring would be held by the collar and the new driven hub respectively. The spring in its wrapped down condition would tightly encircle the new driving member to rotate the new driven hub and in its unwrapped condition the new driving hub would rotate relative to the spring.

A further obvious modification is to make the spring be of the normally unwrapped type so that the spring would be coupled to the driving hub and normally rotate free of the driven hub. The spring is actuatable to wrap down on the driven hub to have the driving hub rotate the driven hub. In this instance, for example, the control collar could comprise two concentric collars, a first collar having the stop portion engageable by the stop means and a second collar coupled to the spring tang and frictionally rotatable within the first collar. When the first collar is stopped by the stop means, the second collar will be frictionally retarded in its rotation to wrap down the spring on the driven hub. Also, in this instance, for example, one control collar could be employed without a stop portion, and the stop means when engaging the collar would merely frictionally retard the rotation of the collar to wrap down the spring on the driven hub to have the driving hub, which is coupled to the spring, rotate the driven hub. In either of these last-mentioned control collar arrangements, an over-travel pin would not be employed with the control collar and the clutch would be an on-off clutch rather than a single revolution clutch.

It will be observed that in accordance with the present invention, an improved clutch unit is provided which is compact and economical. The frame is rotatable about the axis of rotation of the clutch assembly and supports the stop means for engaging the control collar to actuate the clutch spring. It will be appreciated by those skilled in the art that the capabilities of the clutch unit described fulfill the need for an economical and versatile clutch unit that is useful in a wide variety of applications to eliminate adjustment and positioning problems.

While the invention has been described with particular

I claim:

1. A clutch unit comprising: a rotatable driving hub, a rotatable driven hub, bearing and support means for the hubs including a tubular shaft holding said hubs in coaxially aligned positions and about which at least one of the hubs is rotatable, the hubs and shaft being rotatable members, a frame, a one piece bearing member of reduced friction bearing material supported by the frame, the frame being supported through the bearing member by at least one of the rotatable members, the frame being rotatable relative to the hubs about the axis of the shaft, the tubular shaft being adapted to receive a power shaft for transmitting or receiving power and the tubular shaft having ends terminating near ends of the hubs supported thereon, the tubular shaft having connecting means associated therewith for drivingly connecting the tubular shaft with the power shaft, clutch means supported by at least one of the hubs for coupling the driving hub to the driven hub to cause rotation of the driven hub with the driving hub, and actuator means supported on the frame in a position to cooperate with the clutch means for actuating the clutch means between engagement and disengagement, the bearing member permitting the at least one rotatable member to continuously rotate relative to the frame without substantial friction, the at least one rotatable member supporting the frame being the rotatable member which is driving or driven, whereby the at least one of the rotatable members supports the frame and the frame supports the actuator means such that the frame and actuator means may be rotatable repositioned relative to the clutch means.

2. The clutch unit of claim 1 in which the driven hub comprises an output member and an adjustable collar coupled to the clutch means, the output member being rotatable relative to the adjustable collar, and adjustable means for coupling the adjustable collar to the output member at different relative positions, whereby rotation of the frame provides an adjustment for repositioning the actuator means relative to the clutch means and the adjustable collar provides an adjustment for repositioning the output member relative to the clutch means and actuator means.

3. The clutch unit of claim 1 in which the frame is of a one-piece construction having at least one side member, and the hubs, clutch means and actuator means are located on one side of the at least one side member of the frame.

4. The clutch unit of claim 3 in which the frame is formed by stamping.

5. The clutch unit of claim 1 in which the frame includes interconnected generally parallel side members having aligned bearings for holding at least one of the rotatable members; and in which the hubs, clutch means and actuator means are located generally between the side members of the frame.

6. The clutch unit of claim 5 in which the frame is of a one-piece channel-shaped construction.

7. The clutch unit of claim 1 in which the clutch means comprises a helical clutch spring surrounding the hubs and attached at one end to one of the hubs and collar means fixed to the other end of the spring, the actuator means being supported on the frame such that the actuator means is actuated to engage and disengage the collar means to cause the clutch spring in one position to engage and in the other to disengage the other of the hubs.

8. The clutch unit of claim 1 in which the clutch means comprises a clutch spring encircling the driving hub and driven hub and attached to the driven hub, the clutch spring having a wrap-down condition for causing rotation of the driven hub with the driving hub and an unwrap condition in which the driving hub rotates free of the driven hub, and control collar means engaging the free end of the spring to be rotatable with the spring and having a stop portion, the actuator means being supported on the frame in a position to be cooperable with the stop portion of the collar means to stop the collar means and actuate the spring to its unwrap condition.

9. The clutch unit of claim 8 in which the driven hub comprises an output member and an adjustable collar coupled to the spring, the output member being rotatable relative to the adjustable collar, and means for coupling the adjustable collar to the output member at different relative positions, whereby rotation of the frame provides an adjustment for repositioning the actuator means relative to the stopping position of the output member and the adjustable collar provides another adjustment for repositioning the stopping position of the output member relative to the actuator means.

10. The clutch unit of claim 8 further comprising means coupled to the frame for preventing backup of the driven hub relative to the control collar means when the control collar means is stopped.

11. The clutch unit of claim 9 further comprising brake means associated with the control collar means for stopping the driven hub after the control collar means has been stopped but permitting limited movement between the driven hub and control collar means for loosening the spring from the driving hub.

12. The clutch unit of claim 1 in which the clutch means comprises a clutch spring encircling the driving hub and driven hub and attached to the driven hub, the clutch spring having a wrap-down condition for causing rotation of the driven hub with the driving hub and an upwrap condition in which the driving hub rotates free of the driven hub, and control collar means engaging the free end of the spring to be rotatable with the spring; the driven hub including an output member, an adjustable collar coupled to the spring, and means for coupling the adjustable collar to the output member at different relative positions; the actuator means being supported on the frame in a position to be cooperable with the control collar means to stop the control collar means to actuate the spring to its unwrap condition.

13. The clutch unit of claim 12 further comprising brake means for coupling the control collar means and the adjustable collar of the driven hub, the control collar means and adjustable collar providing coupling members attached to the spring, the brake means including a projection supported by one of the coupling members, the other coupling member having an enclarged opening adapted to receive the projection such that, when the control collar means is stopped by the actuator means, the adjustable collar of the driven hub will be stopped but limited movement being permitted between the adjustable collar and control collar means for loosening of the spring from the driving hub.

14. A clutch unit comprising: a tubular shaft providing support of relative rotatable members along an axis of rotation; a driving member rotatably supported on the shaft; a driven member rotatably supported on the shaft; at least one of the members being rotatable about the shaft, the driving and driven members and shaft being rotatable members, a frame, a one piece bearing member of reduced friction bearing material supported by the frame, the frame being supported through the bearing member by at least one of the rotatable members, the frame being rotatable relative to the rotatable members about the axis of the shaft, the tubular shaft being adapted to receive a power shaft for transmitting or receiving power and the tubular shaft having ends terminating near end of the driving and driven members, the tubular shaft having connecting means associated therewith for drivingly connecting the tubular shaft with the power shaft, clutch means for coupling the driving member to the driven member, the clutch means having a normally connected condition for causing rotation of the driven member with the driving member and a disconnected condition in which the driving member rotates free of the driven member; actuator means supported on the frame and engageable with the clutch means to actuate the clutch means into its disconnected condition; the bearing member permitting the at least one rotatable member to continuously rotate relative to the frame without substantial friction, the at least one rotatable member supporting the frame being the rotatable member which is driving or driven, the frame being rotatable about said axis of the rotatable members such that the frame and actuator means may be rotatably repositioned relative to the clutch means.

15. A clutch unit comprising: a tubular shaft providing support of relative rotatable members along an axis of rotation; a driving member rotatably supported on the shaft; a driven member rotatably supported on the shaft; at least one of the members being rotatable about the shaft, the driving and driven members and shaft being rotatable members, a frame, a one piece bearing member of reduced friction bearing material supported by the frame, the frame being supported through the bearing member by at least one of the rotatable members, the frame being rotatable relative to the rotatable members about the axis of the shaft, the tubular shaft being adapted to receive a power shaft for transmitting or receiving power and the tubular shaft having ends terminating near ends of the driving and driven members, the tubular shaft having connecting means associated therewith for drivingly connecting the tubular shaft with the power shaft; clutch means for coupling the driving member to the driven member, the clutch means having a connected condition for causing rotation of the driven member by the driving member and a normally disconnected condition in which the driving member rotates free of the driven member; actuator means supported on the frame and engageable with the clutch means to actuate the clutch means to connect the driven member to the driving member, the bearing member permitting the at least one rotatable member to continuously rotate relative to the frame without substantial friction, the at least one rotatable member supporting the frame being the rotatable member which is driving or driven, the frame being rotatable about the axis of the rotatable members such that the frame and actuator means may be rotatably positioned relative to the clutch means.

16. A clutch unit comprising: a frame having an opening therein providing an axis through the frame and adapted to be supported by relative rotatable members along the axis; a driving member rotatably supported along the axis; a driven member rotatably supported along the axis; a helical clutch spring coupled at one end to the driven member and tightly encircling the driving member; a control member engaging the free end of the spring to be rotatable with the spring and having a stop portion; stop means movably supported on the frame and engageable with the stop portion to stop rotation of the control member to unwind the spring and allow the driving member to rotate relative to the driven member; means for actuating the stop means between a position to engage the stop portion of the control member and a position away from engagement with the stop portion, the frame being supported on the rotatable members such that the frame may be rotated about the axis of rotation of the rotatable members to adjust the position the control member will be stopped; and brake means associated with the control member for stopping the driven member after the control member has been stopped but permitting limited movement between the driven member and the control member for loosening of the spring from the driving member, whereby the driven member will be stopped at a predetermined position relative to the control member; the driven member including an output member to be coupled to a driven system, a first collar member coupled to the one end of the spring and a second collar member for being stopped by the brake means associated with the control member, the output member being rotatable relative to the first collar member and the first collar member being rotatable relative to the second collar member, and means for coupling the output member to the first collar member and the first collar member to the second collar member in different relative positions so that, when the control member is stopped, the output member may be adjusted to be stopped in a predetermined relation relative to the control member.

17. A clutch unit comprising: a frame having an opening therein providing an axis through the frame and adapted to be supported by relative rotatable members along the axis; a driving member rotatably supported along the axis; a driven member rotatably supported along the axis; a shaft on which the driving member and driven member are supported, the shaft being axially splined and the driven member being forced on the splined portion to be coupled to the shaft, the driving member being rotatably supported on the shaft; a helical clutch spring coupled to one end to the driven member and tightly encircling the driving member; a control member engaging the other end of the spring to be rotatable with the spring and having a stop portion; stop means movably supported on the frame and engageable with the stop portion to stop rotation of the control member to unwind the spring and allow the driving member to rotate relative to the driven member; and means for actuating the stop means between a position to engage the stop portion of the control member and a position away from engagement with the stop portion, the rotatable members being supported such that the frame may be rotated about the axis of rotation of the rotatable members to adjust the position the control member will be stopped.

References Cited
UNITED STATES PATENTS

| | | | |
|---|---|---|---|
| 1,090,444 | 3/1914 | Barnard | 192—26 |
| 2,475,432 | 7/1949 | Marihart. | |
| 2,685,949 | 8/1954 | Dunlap. | |
| 2,743,802 | 5/1956 | Hart | 192—26 X |
| 3,080,027 | 3/1963 | Bowers | 192—26 |
| 3,087,587 | 4/1963 | Flieg | 192—26 |
| 3,181,669 | 5/1965 | Kunde et al. | 192—81 |
| 3,186,530 | 6/1965 | Petroff | 182—12 |

BENJAMIN W. WYCHE III, *Primary Examiner.*

CARLTON R. CROYLE, *Examiner.*

M. M. NEWMAN, *Assistant Examiner.*